UNITED STATES PATENT OFFICE 2,351,345

PROCESS FOR THE PRODUCTION OF ARTIFICIAL FILAMENTS, FIBERS, AND FOILS

Johannes Kleine, Dessau, Germany; vested in the Alien Property Custodian

No Drawing. Application December 7, 1940, Serial No. 369,127. In Germany December 14, 1939

2 Claims. (Cl. 18—54)

My invention relates to new filaments, fibers, foils, films and the like and more particularly to such articles made from high molecular weight paraffines.

This case is a continuation-in-part of my co-pending application Ser. No. 341,183, filed June 18, 1940, which is directed to a process of preparing artificial fibers, foils, films and ribbons from high molecular weight paraffines containing more than 400 carbon atoms in the chain and produced from coal or carbon monoxide by hydrogenation under a pressure of 150–200 atms.

This invention has for an object the provision of fibers, films and the like from paraffines produced by hydrogenation under a low pressure.

Another object is to provide fibers and the like from paraffines produced by hydrogenation under atmospheric pressure.

Further objects will be apparent from the reading of the following description.

I have found that fibers, films and the like can be obtained not only from paraffines produced by pressure hydrogenation as disclosed in my co-pending application mentioned above, but also from paraffines prepared according to "Fischer's synthesis." Compared with the process described in the co-pending application the employment of the latter paraffines has the great advantage that products with straight chains are mainly formed which are very suitable for the intended use in question. Especially useful are hydrocarbons containing at least 600 carbon atoms, and of these hydrocarbons paraffines with more than 800 carbon atoms and a straight chain have highly valuable properties.

It is therefore of advantage to carry out the synthesis of the paraffines in such a manner that as many hydrocarbons with very high molecular weight as possible are produced. It is also possible to obtain such paraffines from the mixture of the hydrocarbons prepared by the normal pressure process or to extract them from the contact substance after the synthesis has been carried out for a certain time. However, the way first mentioned above is the most favourable.

It has been found that "Fischer's synthesis" yields a high percentage of the desired paraffines if carried out at a low temperature, i. e. a temperature which is lower than that at which the catalyst leads to formation of benzine hydrocarbons as characteristic products on the same conditions apart from this. Moreover, it is advantageous if the amount of the gas mixture upon which the contact substance acts and the height of the catalyst layer are relatively small. In most cases it is favourable to employ catalysts strongly pressed. Furthermore paraffines suitable for the present invention are prepared if a greater amount of hydrogen is used in the synthesis than corresponds to a ratio of $CO:H_2=1:2$, for instance ratios of 1:2.2 or 1:2.3 (or more).

The reaction may be carried out by means of catalysts suitable for producing paraffine hydrocarbons according to "Fischer's synthesis." Useful are metals of the eighth group of the periodic classification, especially the metals of the iron group, the platinum group and the palladium group. In general it is preferable to employ catalysts containing cobalt, nickel or copper.

The synthesis may be accomplished by passing the reactants either in gaseous or in liquid form through the contact substances. In the former case it is generally of advantage to extract the highest molecular weight paraffines after a certain duration of action, for instance by boiling aromatic hydrocarbons such as tetrahydronaphthalene. It is also possible to use several solvents together or one after another, for instance, a mixture of benzene and toluene or first benzene and subsequently xylene. The extraction may also be carried out under different pressures. The contact substances may, for instance, be treated with benzene under atmospheric pressure until the paraffines have ceased to dissolve. The pressure is then increased to 10 atms. and the highest molecular weight paraffines are subsequently extracted with the benzene which now possesses a higher boiling point.

When liquid reactants are present, a fixed catalyst may be used upon which the gas and the liquid act simultaneously. When catalysts in suspended form are used, portions of the resulting products may be separated continuously from the circulation in order to obtain the desired paraffines therefrom.

It is important to prevent the temperature from rising too rapidly during the reaction. For obtaining suitable paraffines it is therefore necessary to lead off the formed heat of reaction as fast as possible, for instance, with the aid of a cooling apparatus which is directly connected with the contact chamber and in which the heat of reaction serves to warm or evaporate liquids. The heat may also be removed inside the contact chamber by cooling the oil. Furthermore the temperature may be decreased by intensely circulating and carrying off the reaction gases out of the contact chamber and cooling them outside it. It is also possible to obtain a cooling effect by wetting the catalysts with liquids which evaporate when heated. Finally combinations of several cooling methods are applicable.

The high molecular weight hydrocarbons may be produced in one or several stages. Sometimes it is desirable to combine the synthesis described above with other manufacturing processes, for instance a process of making benzine or gasolene. In this case it is convenient to prepare high molecular weight paraffines according to the present invention in the first stage and benzine hydrocarbons in the next stages from the gases exhausted in the first step.

The more detailed practice of the invention is illustrated by the following example, wherein parts given are by volume. There are of course many forms of the invention other than this specific embodiment.

The contact substance ($Co$-$Al_2O_3$-$ZnO$) which is arranged in the contact chamber of a pipe furnace, the pipes of which have a diameter of 15 mm., is strongly pressed and the height of the catalyst layer is 1 m. The gas mixture ($CO:H_2=1:2.3$) is passed through the contact chamber under a pressure of 11 atms. and a velocity of 60 parts of gas per one part of catalyst for one hour at 180° C. The synthesis is stopped after a duration of action of 48 hours, whereupon the contact substance is extracted with liquid benzene at boiling temperature under atmospheric pressure until the paraffines have ceased to dissolve. The pressure is then raised to 6 atms. and the extraction continued. Finally the extraction is carried out under 11 atms. When these extraction procedures are finished, the gas mixture is again passed through the contact chamber. The paraffines extracted under 11 atms. melt at about 133° C. This modification of the synthesis yields 10 grams of such paraffines per 1 cbm. of gas mixture.

The paraffines thus obtained may be freed from the low melting constituents by fractional extraction with xylene. The resultant paraffine yields valuable fibers on spinning from melt. Especially useful is the process disclosed in U. S. patent application Ser. No. 220,236, filed July 20, 1938. In using this spinning process the paraffine is cast to form a rod (or ribbon) which is then brought into a melting room electrically heated and closed by the spinning nozzle having an inside diameter of 0.03 mm. The rod is molten near the nozzle and the molten paraffine is then pressed through it by the weight of the rod itself. The extruded filaments as they are collected may be transferred without a loop over two drums, the second of which is driven with a speed 5 times that of the first drum, whereby the filaments are stretched and thus obtain an extremely high strength.

The high molecular weight paraffines produced according to the present invention are worked up in the manner as described in the co-pending application Ser. No. 341,183 mentioned above. The filaments, foils and films made from these paraffines may likewise be used for the production of textile goods, wrapping materials, photographic films and the like.

I claim:

1. A process for the production of fibers, films and ribbons which comprises melting paraffins having mainly straight chains of more than 600 carbon atoms prepared by reacting one part of carbon monoxide with at least two parts of hydrogen under a pressure up to about eleven atmospheres and at an elevated temperature below that at which benzine hydrocarbons would normally be formed under the same conditions, and spinning fibers, films and ribbons from the melt.

2. A process as defined in claim 1 wherein the reaction of carbon monoxide with hydrogen is carried out under atmospheric pressure.

JOHANNES KLEINE.